US009864795B1

(12) United States Patent
Halevy et al.

(10) Patent No.: US 9,864,795 B1
(45) Date of Patent: Jan. 9, 2018

(54) IDENTIFYING ENTITY ATTRIBUTES

(71) Applicant: Google Inc., Mountain View, CA (US)

(72) Inventors: Alon Yitzchak Halevy, Los Altos, CA (US); Fei Wu, Seattle, WA (US); Steven Euijong Whang, Mountain View, CA (US); Rahul Gupta, Mountain View, CA (US)

(73) Assignee: Google Inc., Mountain View, CA (US)

( * ) Notice: Subject to any disclaimer, the term of this patent is extended or adjusted under 35 U.S.C. 154(b) by 409 days.

(21) Appl. No.: 14/526,116

(22) Filed: Oct. 28, 2014

Related U.S. Application Data (60) Provisional application No. 61/896,568, filed on Oct. 28, 2013.

(51) Int. Cl.
*G06F 17/30* (2006.01)

(52) U.S. Cl.
CPC .. *G06F 17/30598* (2013.01); *G06F 17/30011* (2013.01); *G06F 17/30864* (2013.01)

(58) Field of Classification Search
CPC ......... G06F 17/30864; G06F 17/30867; G06F 17/30637; G06Q 30/02; G06Q 30/0241
USPC ......................................................... 707/706
See application file for complete search history.

(56) References Cited

U.S. PATENT DOCUMENTS

| | | | |
|---|---|---|---|
| 2009/0144609 A1* | 6/2009 | Liang | G06F 17/21 715/230 |
| 2010/0082331 A1* | 4/2010 | Brun | G06F 17/2705 704/9 |
| 2011/0093452 A1* | 4/2011 | Jain | G06F 17/3064 707/723 |
| 2011/0225155 A1* | 9/2011 | Roulland | G06F 17/30598 707/737 |
| 2012/0239600 A1* | 9/2012 | Bollinger | G06F 17/30539 706/12 |
| 2013/0013580 A1* | 1/2013 | Geller | G06F 17/30672 707/706 |
| 2014/0114975 A1* | 4/2014 | Rouat | G06F 7/24 707/737 |

* cited by examiner

*Primary Examiner* — Pierre Vital
*Assistant Examiner* — Andrew N Ho
(74) *Attorney, Agent, or Firm* — Fish & Richardson P.C.

(57) ABSTRACT

Methods, systems, and apparatus, including computer programs encoded on computer storage media, for generating an ontology of entity attributes. One of the methods includes extracting a plurality of attributes based upon a plurality of queries; and constructing an ontology based upon the plurality of attributes and a plurality of entity classes.

15 Claims, 4 Drawing Sheets

IDENTIFYING ENTITY ATTRIBUTES

CROSS-REFERENCE TO RELATED APPLICATION

This application claims priority to U.S. Provisional Application No. 61/896,568, filed on Oct. 28, 2013. The disclosure of the prior application is considered part of and is incorporated by reference in the disclosure of this application.

BACKGROUND

This specification relates to information extraction from electronic documents.

Search engines often are designed to recognize queries that can be answered by structured data. As such, they may invest heavily in creating and maintaining high-precision databases. While conventional databases in this context typically have a relatively wide coverage of entities, the number of attributes they model (e.g., GDP, CAPITAL, ANTHEM) is relatively small.

BRIEF DESCRIPTION OF THE DRAWINGS

Like reference numbers and designations in the various drawings indicate like elements.

DETAILED DESCRIPTION

Extending the number of attributes known to a search engine may enable the search engine to answer more precisely queries that lie outside a "long tail," of statistical query arrangements, extract a broader range of facts from the Web, and/or retrieve information related to semantic information of tables present on the Web.

The present disclosure provides systems and techniques for creating an ontology of, for example, millions of (class, attribute) pairs, including 100,000 or more distinct attribute names, which is up to several orders of magnitude larger than available conventional ontologies. Extending the number of attributes "known" to a search engine may provide several benefits. First, additional attributes may enable the search engine to more precisely answer "long-tail" queries, e.g., brazil coffee production. Second, additional attributes may allow for extraction of facts from Web text using open information extraction techniques. As another example, a broad repository of attributes may enable recovery of the semantics of tables on the Web, because it may be easier to recognize attribute names in column headers and in the surrounding text.

Systems and techniques disclosed herein may extract attributes from a query stream, and then use extractions to seed attribute extraction from other text. For every attribute a set of synonyms and text patterns in which it appears is saved, thereby enabling the ontology to recognize the attribute in more contexts. An attribute in an ontology as disclosed herein includes a relationship between a pair of entities (e.g., CAPITAL of countries), between an entity and a value (e.g., COFFEE PRODUCTION), or between an entity and a narrative (e.g., CULTURE). An ontology as disclosed herein may be described as a "best-effort" ontology, in the sense that not all the attributes it contains are equally meaningful. Such an ontology may capture attributes that people consider relevant to classes of entities. For example, people may primarily express interest in attributes by querying a search engine for the attribute of a particular entity or by using the attribute in written text on the Web. In contrast to a conventional ontology or database schema, a best-effort ontology may not attach a precise definition to each attribute. However, it has been found that such an ontology still may have a relatively high precision (e.g., 0.91 for the top 100 attributes and 0.52 for the top 5000 attributes).

Ontologies as disclosed herein may be particularly well-suited for use in search applications. In particular, tasks such as parsing a user query, recovering the semantics of columns of Web tables, and recognizing when sentences in text refer to attributes of entities, may be performed efficiently. In contrast, conventional ontologies tend to be relatively inflexible or brittle because they rely on a single way of modeling the world, including a single name for any class, entity or attribute. Hence, supporting search applications with a conventional ontology may be difficult because mapping a query or a text snippet to the ontology can be arbitrarily hard. An ontology as disclosed herein may include one or more constructs that facilitate query and text understanding, such as attaching to every attribute a set of common misspellings of the attribute, exact and/or approximate synonyms, other related attributes (even if the specific relationship is not known), and common text phrases that mention the attribute.

Ontology systems and techniques as disclosed herein may include data obtained from one or more other ontologies; for example, an ontology as disclosed may "bootstrap" from another ontology by including some or all of the relationships in that ontology. In addition, new attributes may be extracted from other sources, such as a query stream received by a search engine and text on the Web. A query stream generally is a source of frequently asked attributes. Web text may be even broader in coverage than the query stream, but as previous work on open information extraction has shown, also may be a source of many meaningless attributes. Systems and techniques as disclosed herein may use high-quality attributes extracted from one or more other ontologies and a query stream to contain the extraction of attributes from text using distant supervised learning. It has been found that a combination of a conventional ontology, a query stream, and Web text may result in a high precision ontology. It has also been found that, by considering the verbs with which attributes, are mentioned, it may be possible to classify attributes into categories such as numeric (e.g., GDP), atomic (e.g., CAPITAL), and narrative (e.g., HISTORY). Such a classification may be useful when curating attributes into an existing schema, for further filtering attributes in an ontology, and for downstream applications such as fact extraction and question answering. Systems and techniques disclosed herein also may provide techniques for attaching attributes to the most appropriate class in a given class hierarchy.

An ontology as disclosed herein may identify schema-level attributes that can be associated with classes of entities. For example, CAPITAL, GDP, LANGUAGES SPOKEN, and HISTORY may be identified as attributes of COUNTRIES. In general, an ontology may not be concerned with the values of the attributes, such as the specific GDP of a given country. It may be presumed that a given set of classes of entities exists, such as COUNTRIES or US PRESI- DENTS. These classes may include, for example, types in a conventional ontology and additional classes that identify subsets of those types. It also may be presumed (1) the classes are of high quality (i.e., they correspond to natural sets of entities to model in the world), and (2) for each class a set of instances exists (e.g., France is a country). A subclass hierarchy may be imposed on the set of classes (e.g., US PRESIDENTS is a subclass of POLITICIAN), and the subclass hierarchy may be incomplete. Furthermore, siblings in the hierarchy may not be of equal stature (e.g., the class LOCATIONS may include a relatively important subclass such as TOURIST ATTRACTIONS, and a relatively uninteresting or unimportant subclass such as SPORTS TEAMS LOCATIONS). An attribute is a binary relationship between an entity and another entity (e.g., CAPITAL), between an entity and a value (e.g., GDP), or between an entity and a narrative (e.g., HISTORY). Attributes have domains of instances to which they apply (e.g., the domain of GDP is COUNTRIES), and a range that is either a class (e.g., CITIES) or a type (e.g., integer).

As used herein, the name of an attribute may include a string that may have one or more tokens, such as POPULATION, or LIFE EXPECTANCY FOR WOMEN. Each attribute has a domain class, i.e., the set of entities for which the attribute is defined. Multiple classes may have attributes that have the same name. For example, POPULATION is an attribute of the class LOCATIONS and of the class BIOLOGICAL BREEDS. Hence, the combination of class name and attribute name may uniquely define an attribute. The domain of an attribute specifies that the attribute is applicable to instances of that class. However, the best classes with which to attach an attribute also may be identified. For example, the attribute POPULATION may be applicable to multiple classes, including LOCATIONS and all its subclasses. Every attribute may have a property attached to it that indicates the best places in the class hierarchy to which the attribute should be attached. A range may be associated with an attribute. The range specifies the classes or data types to which the values of the attribute should belong. For example, the range of CAPITAL is CITIES, while the range of LIFE EXPECTANCY is a real number.

To be able to identify mentions of attributes in user-generated content such as queries and text more efficiently, each attribute may be associated with a set of common misspellings and/or a set of synonyms that are believed to refer to the same attribute. Misspellings and synonyms may depend on the class. For example, MOTER is a misspelling of MOTHER for the class PERSON, while it is a misspelling of MOTOR for the class CARS. In addition to synonyms, closely related attributes may be identified. For example, MOTHER may be identified as is a subset of PARENT, FIRST NAME as a part of FULL NAME, and RURAL POPULATION as a component of POPULATION. Similarly, an attribute may be associated with a set of sentence patterns that mention the values of that attribute.

In some configurations, because attributes may be extracted from multiple sources, the set of data sources in which an attribute was identified also may be associated with the attribute. Source-specific provenance information may be included. When two attributes deemed to be synonymous are merged, the provenance of each of the synonyms may be retained.

Whereas a manually-created ontology may model an attribute with a path, configurations disclosed herein may identify attributes that people consider relevant to entities. For example, ARCHITECTURAL STYLE may be an attribute that an ontology as disclosed herein identifies as relevant to the class MUSEUMS. However, the same attribute may be modeled as a path in a conventional ontology: MUSEUMS has an attribute BUILDINGS OCCUPIED that has a set of buildings, and the class BUILDINGS has an attribute ARCHITECTURAL STYLE. Of course, an ontology as disclosed herein also may have the attribute BUILDINGS OCCUPIED for MUSEUMS and ARCHITECTURAL STYLE for BUILDINGS.

Figure 1:
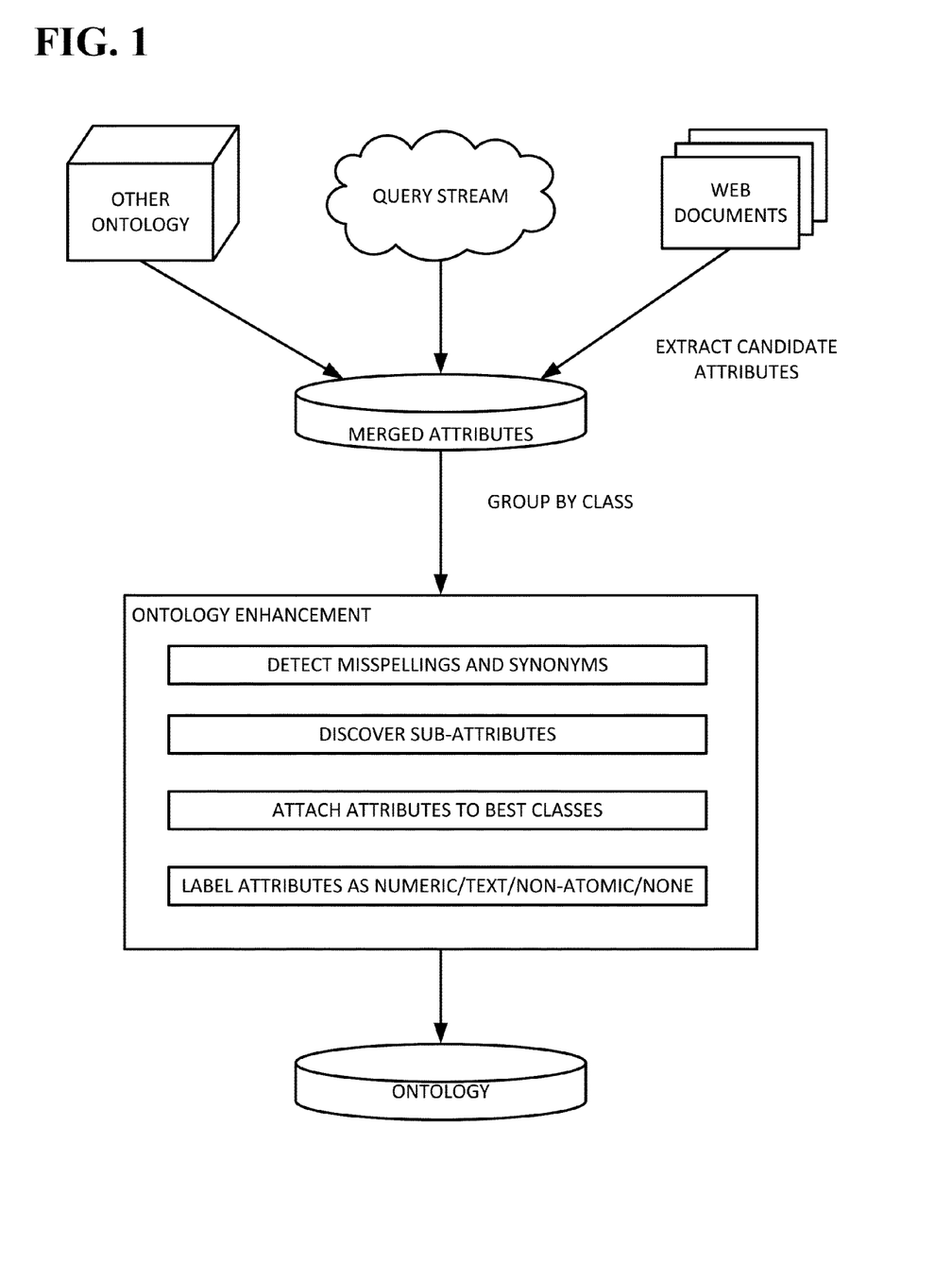
FIG. 1 shows an example system and information flow for extracting data.

An example system and information flow for extracting data according to implementations disclosed herein is shown in FIG. 1. In a first phase, attribute candidates may be extracted from multiple data sources as disclosed herein, such as other ontologies, query streams, and web documents. In a second phase, the extractions may be merged and the ontology enhanced by finding synonyms, related attributes, and the best classes for attributes, and/or categorizing attributes as, for example, numeric, textual, or non-atomic.

Attribute extraction from a conventional ontology may be performed, for example, by iterating over all the types in the ontology and for each type, extracting attached properties. For each property, the name, the type of range, and/or a description may be stored. Attributes present in the ontology also may be attached to the corresponding sub-type or -types. For example, POPULATION may be a property of LOCATIONS in the ontology, but it also may be attached to each of COUNTRIES and to CITIES. Example techniques for extracting from a query stream and from Web text are provided herein.

Once the extractions are completed, the sets of attribute candidates may be merged and indexed by domain class (e.g., all attributes of COUNTRIES may be collected). For example, common misspellings of attribute names may be identified, synonyms among attribute names may be identified, and/or sub-attributes may be identified. Sub-attributes may be identified, for example, based upon evidence found on the Web or other sources that "A ISA B", where both A and B are attributes. As another example, sub-attributes may be identified where, for a pair of attributes in which one includes a modifier on the other (e.g., RURAL POPULATION and POPULATION), the first may be identified as a sub-attribute of the second. Each attribute also may be processed to identify the best classes to which to attach the attribute, as disclosed herein. Each attribute also may be labeled according to a characterization of type, for example, numeric (e.g. COFFEE PRODUCTION), atomic-but-textual (e.g. POLICE-CHIEF), non-atomic (e.g. CULTURE, HISTORY), or none of the above. Such labels may be useful for, for example, manually curating or extracting facts for only atomic attributes, or inferring measurement units and ranges for numeric attributes.

To extract attributes from a query stream, initially one or more query patterns, such as "what is the A of E", may be considered to find candidate attribute names A. For example, the query "what is the population of France" may be used to determine that POPULATION is a candidate attribute of FRANCE. A set of triples of the form (A, E, f) may be constructed, where A is a candidate attribute name, E is an entity string, and f is the number of times the query "A E" or "E A" appeared in the query stream.

Figure 2:
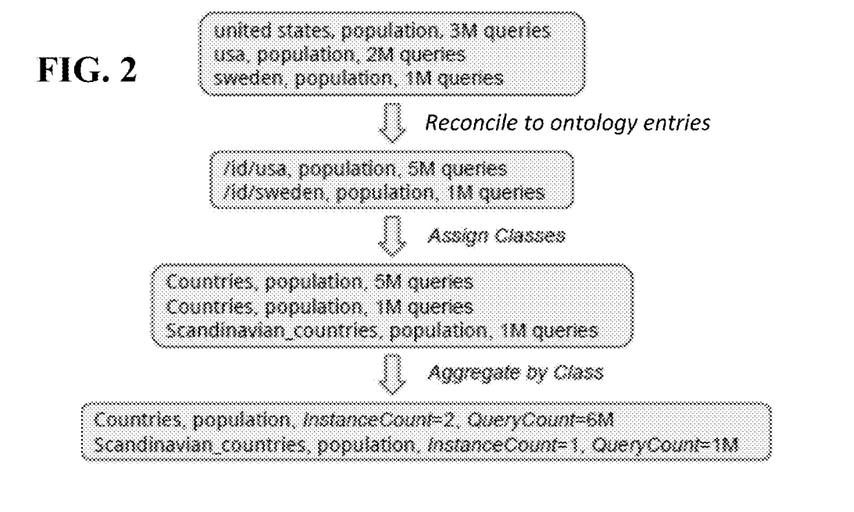
FIG. 2 illustrates extracting entities from a query stream.

In some configurations, for every pair (E, A) or (A, E), where E is an instance of a class C and A is a candidate attribute name, E may be reconciled to an existing conventional ontology. For example, the distinct number of E and/or the total number of queries of the form "A E" or "E A" identified in a query stream may be determined. Together, these values may indicate the importance of the attribute and whether a particular A is an attribute. For example, candidate A's with low counts are typically noise. For each triple, (A, E, f), a process such as the example shown in FIG. 2 may be used.

In some configurations, co-reference mentions may be removed. For example, a common pattern in search queries is to follow an entity by a qualifier. As a specific example, users may query "barack obama president". As a result, PRESIDENT may be extracted as a top attribute of the class US PRESIDENTS, which may be undesirable. To filter or reduce the number of such extractions, Web text that suggests that BARACK OBAMA is a president may be identified, for example by using a conventional coreference resolution algorithm to determine whether the strings "barack obama" and "president" co-refer to the same entity sufficient number of times in the text corpus.

In some configurations, attributes also may be extracted from Web text or other similar sources. For example, a parts-of-speech (POS) tagger, dependency parser, noun phrase segmenter, named entity recognizer, coreference resolver, and/or entity resolver may be applied to Web text to define specific extraction patterns as described herein. The coreference resolver also may resolve pronouns and nominals to entities, thereby increasing coverage.

Given the pre-processed corpus, distant supervision and high-quality attributes extracted from a conventional ontology and a query stream may be used to induce extraction patterns from text. In such a technique, a knowledge base may be created from the top attributes already extracted by the ontology. It may be determined or presumed that if a pair of related entities in this knowledge base is seen in a sentence, then that occurrence expresses the corresponding relation. Referring to the left side of FIG. 3, if COFFEE PRODUCTION is known or presumed to be an attribute of Brazil, then, if text "The coffee production of Brazil rose by 5%", it may be determined that the lexical pattern 'The A of E' and the parse pattern 'A prep> of pobj> E' are candidate patterns that connect an attribute to an entity. From such a process, an aggregated list of candidate patterns may be obtained sorted by frequency, with the number of known attributes they cover. Table 1 shows some of the top lexical and parse patterns thus induced.

TABLE 1

Top few induced lexical (top-table) and parse patterns (bottom table) for attribute-extraction, along with an example.

| Pattern | Example |
| --- | --- |
| E A | [Google] (CEO) Larry Page |
| A, E | Larry Page, (CEO), [Google] |
| (E = his) A | [his] (wife) |
| E's A | [Google]'s (CEO) |
| A of E | (CEO) of [Google] |
| A in E | (urban population) in [Kingston] |
| A of the E | (captain) of the [Australian cricket team] |
| (E = its) A | [its] (fire-chief) |
| A at E | (CEO) at [Google] |
| A for E | (spokesman) for [gun control] |
| A nn > A | [Eagles] (coach) Al Skinner |
| E poss > A | [Susan Sarandon]'s (partner) |
| (E = his) < poss A | [his] (wife) |
| A prep > of pobj > E | (CEO) of [Google] |
| A prep > in pobj > E | (MVP) in the [National League] |
| A appos > E | Steve Jobs, former (CEO), [Apple] |
| (E = her) < poss A | [her] (husband) |
| A prep > with pobj > E | (hitting coach) with the [Yankees] |

In some configurations, it may be desirable to add atomic values with clearly defined values to the ontology. For example, COFFEE PRODUCTION and POLICE-CHIEF are atomic, while CULTURE, HISTORY, and ETHICAL GUIDELINES are not. Classifying attributes as atomic versus non-atomic also enables detection of meta-data such as ranges and units, and ultimately extraction of attribute values.

Atomic attributes may be sub-categorized into, for example, numeric and atomic-textual. For example, COFFEE-PRODUCTION is numeric, whereas POLICE-CHIEF is atomic-textual. This categorization is illustrative, and is not exhaustive since as there are other kinds of attributes that may not be fully covered by these three categories, such as phone-numbers/dates, misspellings, discrete-valued attributes, etc. These may be placed in a fourth category such as a less structured "other" category. Independent binary classifiers may be constructed for the three more-structured categories of interest.

Figure 3:
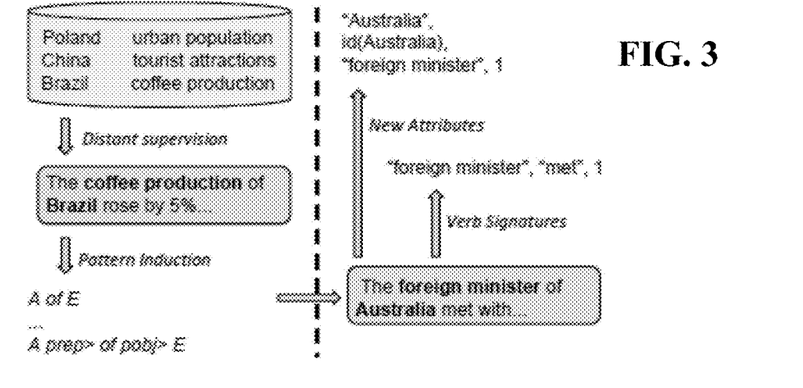
FIG. 3 illustrates extracting attributes using an example entity-attribute pair.

Each classifier may leverage linguistic cues as features. For example, where dependency parse information is available for a sentence in the corpus, and since each attribute is a noun phrase, it is possible to determine the verb in the sentence that it is a grammatical subject of For example, by looking at the text "Brazil's coffee production increased by 5%", it may be determined that COFFEE PRODUCTION is a numeric attribute since the verb-lemma 'increase' is positively correlated with the presence of numeric attributes. Similarly, by looking at the text "New York's police-chief resigned today . . . ", it may be determined that POLICE-CHIEF is not a numeric attribute as the verb-lemma 'resign' is negatively correlated with numeric attributes. A set of top-k verbs that are nsubj parents of the attribute in our text corpus, where k is set via cross-validation, may be constructed. For example, the verbs may be extracted from the text along with the attribute, such as illustrated in FIG. 3. Table 2 shows an illustrative example of top few verbs for some sample attributes. As illustrated earlier, numeric attributes like COFFEE PRODUCTION and ENROLLMENT are strongly associated with verb-lemmas like increase, decline, drop etc. At the same time, popular verbs like have, say, become are present in every category, and may be given low weights during training.

Using raw lexical terms as features may be prone to overfitting due to the huge vocabulary size, as well as unknown features at test time. Hashing may be used to reduce the verb vectors to a standard space with a preset dimensionality d. For example, each verb vi may be hashed to dimension h(vi) mod d, where h is a hash-function.

The hashed features then may be combined, for example using a logistic regression model whose weights are learned using a small manually labeled corpus of attributes. The model may be regularized using both L1 and L2 costs, for example by optimizing the training objective:

$$\min_W \sum_i W^T \cdot F(x_i, y_i) + \lambda_1 \|W\| + \lambda_2 \|W\|^2 \quad (1)$$

where W is the weight vector to be trained, $F(x_i; y_i)$ is the hashed feature vector for training attribute $x_i$ labeled as $y_i \in \{-1, 1\}$, and $\lambda_1, \lambda_2$ are the L1/L2 hyperparameters set using cross-validation.

As previously disclosed, an ontology may attach an attribute to every class in a hierarchy to which it is relevant. This may be appropriate, for example, to verify whether an attribute is relevant to a particular class. It also may be desirable to find the best classes to which to attach an attribute.

Figure 4:
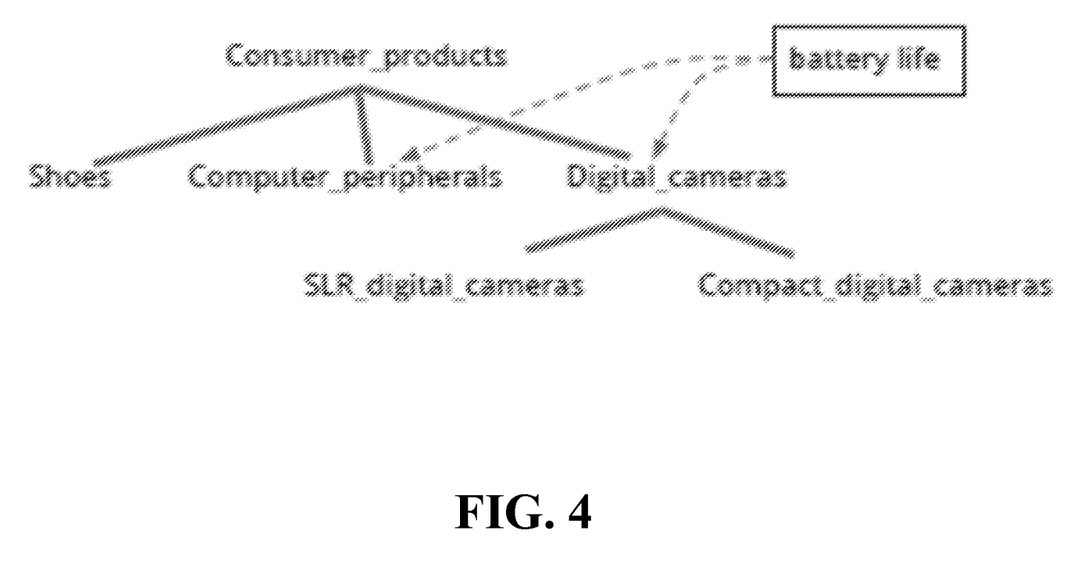
FIG. 4 shows an example class hierarchy.

For example, it may be desired to assign the attribute BATTERY LIFE to classes in the example hierarchy shown in FIG. 4.

The top-most class CONSUMER PRODUCTS may be too broad because, for example, not all consumer products (e.g., SHOES) have batteries. The leaf classes SLR DIGITAL CAMERAS and COMPACT DIGITAL CAMERAS, on the other hand, may be considered too specific because any digital camera has a battery. As a result, the class DIGITAL CAMERAS may be considered as a best class for BATTERY LIFE.

Similarly, COMPUTER PERIPHERALS (a sibling class of DIGITAL CAMERAS) also may be considered as a best class for BATTERY LIFE. Alternatively, if BATTERY LIFE applies to the vast majority of the sub-classes of CONSUMER PRODUCTS, it may be attached to CONSUMER PRODUCTS.

The following pseudocode provides an example technique to determine best classes, $O_A$, for an attribute A, as disclosed herein:

```
    input: An attribute A and a forest of classes T.
    output: O_A: the classes to which we attach A.
 1  O_A ← φ;
 2  foreach C ∈ T.Classes s.t. (C, A) is extracted do
 3  |   Add the roots of T that contain C to relevantRoots;

4  foreach R ∈ relevantRoots do
 5  |   t ← tree with root R;
 6  |   foreach C ∈ t.Classes in post order do
 7  |   |   if C is not leaf node then
 8  |   |   |   Compute S(C_i, A), i = 1, ..., n, C_i ∈ C.children;
 9  |   |   |   if D(C_1, ..., C_n, A) > θ then
10  |   |   |   |   O_A ← O_A ∪ {C_j}, where S(C_j, A) > α · max_i
    |   |   |   |      S(C_i, A)};
11  |   |   else if C = root then
12  |   |   |   Add C to root List;
    |   |   —
    |   —
    |
13  foreach ROOT ∈ rootList do
14  |   if S(ROOT, A) > α · max_{RerootList} {S(R, A)} then
15  |   |   O_A ← O_A ∪ ROOT;
    |   —

16  return O_A;
```

Informally, for every attribute A, the algorithm traverses, in a bottom-up fashion, each tree of classes for which A has been marked as relevant (i.e., each tree that contains class C where (C, A) is extracted). For each pair of class and attribute, (C, A), the support for A in C, S(C, A) is determined from the provenance. For example, for an attribute extracted from a query stream, the support may be calculated as the ratio between the number of instances of C that have A and the maximal number of instances for any attribute of C:

$$S_{query}(C, A) = \frac{InstanceCount(C, A)}{\max_{A^*}\{InstanceCount(C, A^*)\}}$$

The support from text extractions may be computed similarly. The support for attributes from a conventional ontology may be defined as 1. S(C, A) may be defined to be the maximal support it gets from any of the sources from which it was extracted.

In some configurations, it may be determined whether several siblings, each with sufficient support, should all be in $O_A$, or whether the analysis should continue up the class hierarchy. To make this determination, a diversity measure may be computed for the siblings. If there is little diversity among the support for the siblings, analysis may continue up the tree. If there is significant diversity, i.e., only a few of the siblings have sufficient support, those siblings may be selected. The diversity may be defined as:

$$D(C_1, \ldots, C_n, A) = \begin{cases} \frac{1}{n-1} \sum_{i=1}^{n} \frac{\max_{j=1,\ldots,n}\{S(C_j, A)\} - S(C_i, A)}{\max_{j=1,\ldots,n}\{S(C_j, A)\}} & n > 1, \\ 0 & n = 1 \end{cases}$$

where $C_1, \ldots, C_n$ are sibling classes. When the diversity is above a threshold θ, all the siblings whose support is a factor of more than the highest among the siblings may be added to $O_A$.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

generating an ontology of class-attribute pairs, wherein each class that occurs in the class-attribute pairs of the ontology is a class of entities and each attribute occurring in the class-attribute pairs of the ontology is an attribute of the respective entities in the class of the class-attribute pair in which the attribute occurs, wherein each attribute in the class-attribute pairs has one or more domains of instances to which the attribute applies and a range that is either a class of entities or a type of data, and wherein generating the ontology comprises:

obtaining class-entity data representing a set of classes and, for each class, entities belonging to the class as instances of the class;

obtaining a plurality of entity-attribute pairs, wherein each entity-attribute pair identifies an entity that is represented in the class-entity data and a candidate attribute for the entity;

determining a plurality of attribute extraction patterns from occurrences of the entities identified by the entity-attribute pairs with the candidate attributes identified by the entity-attribute pairs in text of documents in a collection of documents, wherein determining the plurality of attribute extraction patterns comprises:

identifying an occurrence of the entity and the candidate attribute identified by a first entity-attribute pair in a first sentence from a first document in the collection of documents;

generating a candidate lexical attribute extraction pattern from the first sentence;

generating a candidate parse attribute extraction pattern from the first sentence; and selecting the candidate lexical attribute extraction pattern and the candidate parse attribute extraction pattern as attribute extraction patterns if the candidate lexical attribute pattern and the candidate parse attribute extraction patterns were generated using at least a predetermined number of unique entity-attribute pairs; and applying the plurality of attribute extraction patterns to the documents in the collection of documents to determine entity-attribute pairs, and from the entity-attribute pairs and the class-entity data, for each of one or more entity classes represented in the class-entity data, attributes possessed by entities belonging to the entity class.

2. The method of claim 1, wherein obtaining the plurality of entity-attribute pairs comprises:

extracting one or more of the plurality of entity-attribute pairs from a stream of search queries submitted to a search engine.

3. The method of claim 2, wherein extracting the one or more entity-attribute pairs comprises:

applying one or more predetermined patterns to the search queries in the stream to extract one or more candidate entity-attribute pairs.

4. The method of claim 1, wherein generating the ontology comprises:

classifying each of the determined attributes as either non-atomic, numeric or atomic-textual.

5. The method of claim 4, wherein classifying each determined attribute comprises processing features associated with the determined attribute using each of a plurality of classifiers to determine the classification for the determined attribute, wherein each classifier is specific to a respective one of the possible classifications for the determined attribute.

6. The method of claim 1, wherein the entity classes are arranged in a hierarchy, and wherein generating the ontology comprises:

determining, for each of the plurality of determined attributes, one or more best entity classes for the determined attribute.

7. A system comprising one or more processors and one or more computer-readable media storing instructions that when executed by the one or more processors to cause the one or more processors to perform operations comprising:

generating an ontology of class-attribute pairs, wherein each class that occurs in the class-attribute pairs of the ontology is a class of entities and each attribute occurring in the class-attribute pairs of the ontology is an attribute of the respective entities in the class of the class-attribute pair in which the attribute occurs, wherein each attribute in the class-attribute pairs has one or more domains of instances to which the attribute applies and a range that is either a class of entities or a type of data, and wherein generating the ontology comprises:

obtaining class-entity data representing a set of classes and, for each class, entities belonging to the class as instances of the class;

obtaining a plurality of entity-attribute pairs, wherein each entity-attribute pair identifies an entity that is represented in the class-entity data and a candidate attribute for the entity;

determining a plurality of attribute extraction patterns from occurrences of the entities identified by the entity-attribute pairs with the candidate attributes identified by the entity-attribute pairs in text of documents in a collection of documents, wherein determining the plurality of attribute extraction patterns comprises:

identifying an occurrence of the entity and the candidate attribute identified by a first entity-attribute pair in a first sentence from a first document in the collection of documents;

generating a candidate lexical attribute extraction pattern from the first sentence;

generating a candidate parse attribute extraction pattern from the first sentence; and selecting the candidate lexical attribute extraction pattern and the candidate parse attribute extraction pattern as attribute extraction patterns if the candidate lexical attribute pattern and the candidate parse attribute extraction patterns were generated using at least a predetermined number of unique entity-attribute pairs; and applying the plurality of attribute extraction patterns to the documents in the collection of documents to determine entity-attribute pairs, and from the entity-attribute pairs and the class-entity data, for each of one or more entity classes represented in the class-entity data, determine one or more attributes possessed by entities belonging to the entity class.

8. The system of claim 7, wherein obtaining the plurality of entity-attribute pairs comprises:
extracting one or more of the plurality of entity-attribute pairs from a stream of search queries submitted to a search engine.

9. The system of claim 8, wherein extracting the one or more entity-attribute pairs comprises:
applying one or more predetermined patterns to the search queries in the stream to extract one or more candidate entity-attribute pairs.

10. The system of claim 7, wherein generating the ontology comprises:
classifying each of the determined attributes as either non-atomic, numeric or atomic-textual.

11. The system of claim 10, wherein classifying each determined attribute comprises processing features associated with the determined attribute using each of a plurality of classifiers to determine the classification for the determined attribute, wherein each classifier is specific to a respective one of the possible classifications for the determined attribute.

12. The system of claim 7, wherein the entity classes are arranged in a hierarchy, and wherein generating the ontology comprises:
determining, for each of the plurality of determined attributes, one or more best entity classes for the determined attribute.

13. A non-transitory computer-readable medium storing instructions that when executed by one or more processors cause the one or more processors to perform operations comprising:
generating an ontology of class-attribute pairs, wherein each class that occurs in the class-attribute pairs of the ontology is a class of entities and each attribute occurring in the class-attribute pairs of the ontology is an attribute of the respective entities in the class of the class-attribute pair in which the attribute occurs, wherein each attribute in the class-attribute pairs has one or more domains of instances to which the attribute applies and a range that is either a class of entities or a type of data, and wherein generating the ontology comprises:
obtaining class-entity data representing a set of classes and, for each class, entities belonging to the class as instances of the class;
obtaining a plurality of entity-attribute pairs, wherein each entity-attribute pair identifies an entity that is represented in the class-entity data and a candidate attribute for the entity;
determining a plurality of attribute extraction patterns from occurrences of the entities identified by the entity-attribute pairs with the candidate attributes identified by the entity-attribute pairs in text of documents in a collection of documents, wherein determining the plurality of attribute extraction patterns comprises:
identifying an occurrence of the entity and the candidate attribute identified by a first entity-attribute pair in a first sentence from a first document in the collection of documents;
generating a candidate lexical attribute extraction pattern from the first sentence;
generating a candidate parse attribute extraction pattern from the first sentence; and
selecting the candidate lexical attribute extraction pattern and the candidate parse attribute extraction pattern as attribute extraction patterns if the candidate lexical attribute pattern and the candidate parse attribute extraction patterns were generated using at least a predetermined number of unique entity-attribute pairs; and
applying the plurality of attribute extraction patterns to the documents in the collection of documents to determine entity-attribute pairs, and from the entity-attribute pairs and the class-entity data, for each of one or more entity classes represented in the class-entity data, determine one or more attributes possessed by entities belonging to the entity class.

14. The non-transitory computer-readable medium of claim 13, wherein generating the ontology comprises:
classifying each of the determined attributes as either non-atomic, numeric or atomic-textual.

15. The non-transitory computer-readable medium of claim 14, wherein classifying each determined attribute comprises processing features associated with the determined attribute using each of a plurality of classifiers to determine the classification for the determined attribute, wherein each classifier is specific to a respective one of the possible classifications for the determined attribute.

* * * * *